United States Patent
Jin (12)

(10) Patent No.: US 6,357,246 B1
(45) Date of Patent: Mar. 19, 2002

(54) HEAT PUMP TYPE AIR CONDITIONING APPARATUS

(76) Inventor: Keum Su Jin, Room 401 Jupung Village, 316-8, Kil-Dong, Kangdong-Ku, Seoul (KR)

(*) Notice: Subject to any disclaimer, the term of this patent is extended or adjusted under 35 U.S.C. 154(b) by 0 days.

(21) Appl. No.: 09/634,903

(22) Filed: Aug. 9, 2000

(30) Foreign Application Priority Data

Dec. 30, 1999 (KR) .............................. 99-67539

(51) Int. Cl.[7] .................................. F25B 27/00
(52) U.S. Cl. ............... 62/238.7; 62/235.1; 62/324.1; 237/2 B; 165/48.2
(58) Field of Search ................. 62/324.1, 324.5, 62/324.6, 150, 238.7, 235.1, 238.6; 165/48.2; 126/635; 237/2 B

(56) References Cited

U.S. PATENT DOCUMENTS

| 3,362,184 A | | 1/1968 | Jensen | |
| 4,129,117 A | * | 12/1978 | Harvey | |
| 4,177,794 A | * | 12/1979 | Novinger | |
| 4,256,475 A | * | 3/1981 | Schafer | 62/324.1 X |
| 4,304,223 A | * | 12/1981 | Novinger | |
| 4,308,042 A | * | 12/1981 | Ecker | 62/235.1 X |
| 4,869,074 A | | 9/1989 | Hoshi et al. | |
| 5,491,981 A | | 2/1996 | Kim | |
| 6,050,102 A | | 4/2000 | Jin | |

FOREIGN PATENT DOCUMENTS

| JP | 4918927 | 5/1974 |
| JP | 5445949 | 4/1979 |

* cited by examiner

*Primary Examiner*—Henry Bennett
*Assistant Examiner*—Chen-Wen Jiang
(74) *Attorney, Agent, or Firm*—Hedman & Costigan, P.C.

(57) ABSTRACT

A heat pump type air conditioning apparatus is disclosed. The air conditioning apparatus comprises a heat pump and a heat piping. The heat pump includes a compressor, a four-way valve, an indoor heat exchanger, a pressure reducer for a room cooling operation, another pressure reducer for a room heating operation and an outdoor heat exchanger. The compressor, the four-way valve, the indoor heat exchanger, the pressure reducer for a room cooling operation, the pressure reducer for a room heating operation, the outdoor heat exchanger and the four-way valve are connected one after another in series by means of a first conduit. The four-way valve is additionally connected to the compressor by means of a suction conduit. Two points on a portion of the first conduit directly connecting the outdoor heat exchanger to the four-way valve are additionally connected to each other by means of a second conduit. The heat piping is disposed with its condensing portion situated in front of an ambient air sucking side of the outdoor heat exchanger and its evaporating portion situated in a cost-free heat source.

3 Claims, 3 Drawing Sheets

HEAT PUMP TYPE AIR CONDITIONING APPARATUS

BACKGROUND OF THE INVENTION

1. Field of the Invention

The present invention relates, in general, to a heat pump type air conditioning apparatus and, more particularly, to an apparatus for promoting the evaporation of refrigerant sucked into a compressor during the heating operation of the heat pump type air conditioning apparatus.

2. Description of the Prior Art

As is well known to those skilled in the art, in a heat pump type air conditioning apparatus, its room heating cycle utilizes its room cooling cycle in a reverse manner and employs the ambient air as a heat source. Accordingly, during a room heating operation, the evaporation efficiency of its refrigerant is in proportion to the temperature of the ambient air. As a result, when the temperature of the ambient air is low, the room heating capacity of the air conditioning apparatus is insufficient. Many attempts have been made to overcome such a shortcoming.

As an example, Japanese Utility Model Publication No. Sho 49-18927 discloses an air conditioning apparatus in which an outdoor heat exchanger and two indoor heat exchangers are disposed in a refrigeration cycle. This air conditioning apparatus is operated in such a way that during a room cooling operation, one of the indoor heat exchangers is utilized as an evaporator and the remaining one is shut to cool indoor air, while during a room heating operation, the outdoor heat exchanger is utilized as an evaporator and simultaneously the two indoor heat exchangers are all utilized as condensers to heat indoor air. Japanese Unexamined Patent Publication No. Sho 54-45949 discloses an air conditioning apparatus in which a refrigerant heater is disposed in a room heating cycle. The refrigerant heater is utilized as an evaporator only during a room heating operation, so that refrigerant liquid is forcibly evaporated in the refrigerant heater after high temperature and high pressure refrigerant gas compressed in a compressor is condensed and liquefied into the refrigerant liquid in an indoor heat exchanger to heat the room.

However, with regard to the former air conditioning apparatus, since the compressor must be utilized when indoor air is heated in the two indoor heat exchangers functioning as condensers, the capacity of the compressor must be large, thereby increasing its manufacturing and maintenance costs. In addition, since two indoor heat exchangers must be mounted in the interior of a room, a large portion of the room is occupied by the air conditioning apparatus, thereby limiting the utilization of the interior of the room. Furthermore, since frost is deposited on the outdoor heat exchanger when the temperature of the ambient air is low during the room heating operation, the heat transmitting efficiency of the outdoor heat exchanger is reduced, thereby reducing the evaporating efficiency of the refrigerant and, accordingly, causing the capacity of the air conditioning apparatus to be insufficient.

With regard to the latter air conditioning apparatus, it is described that the refrigerant is forcibly evaporated in the refrigerant heater, so its cooling capacity is not reduced and the defrosting of the outdoor heat exchanger is not necessary. However, since the construction of the refrigerant heater is not disclosed in the Publication, it is assumed that the refrigerant heater heats refrigerant using electricity that allows the refrigerant heater to be small and to be easily mounted, thereby increasing the maintenance cost of the air conditioning apparatus.

SUMMARY OF THE INVENTION

Accordingly, the present invention has been made keeping in mind the above problems occurring in the prior art, and an object of the present invention is to provide a heat pump type air conditioning apparatus, which is capable of maintaining superior room heating capacity in such a way that the evaporation of its refrigerant is promoted using a cost-free heating source when the temperature of the ambient air is low.

In order to accomplish the above object, the present invention provides a heat pump type air conditioning apparatus, comprising: a heat pump having a compressor, a four-way valve, an indoor heat exchanger, a pressure reducer for a room cooling operation, another pressure reducer for a room heating operation and an outdoor heat exchanger, the compressor, the four-way valve, the indoor heat exchanger, the pressure reducer for a room cooling operation, the pressure reducer for a room heating operation, the outdoor heat exchanger and the four-way valve being connected one after another in series by means of a first conduit, the four-way valve being additionally connected to the compressor by means of a suction conduit, and two points on a portion of the first conduit directly connecting the outdoor heat exchanger to the four-way valve being additionally connected to each other by means of a second conduit; and a heat piping disposed with its condensing portion situated in front of an ambient air sucking side of the outdoor heat exchanger and its evaporating portion situated in a cost-free heat source.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
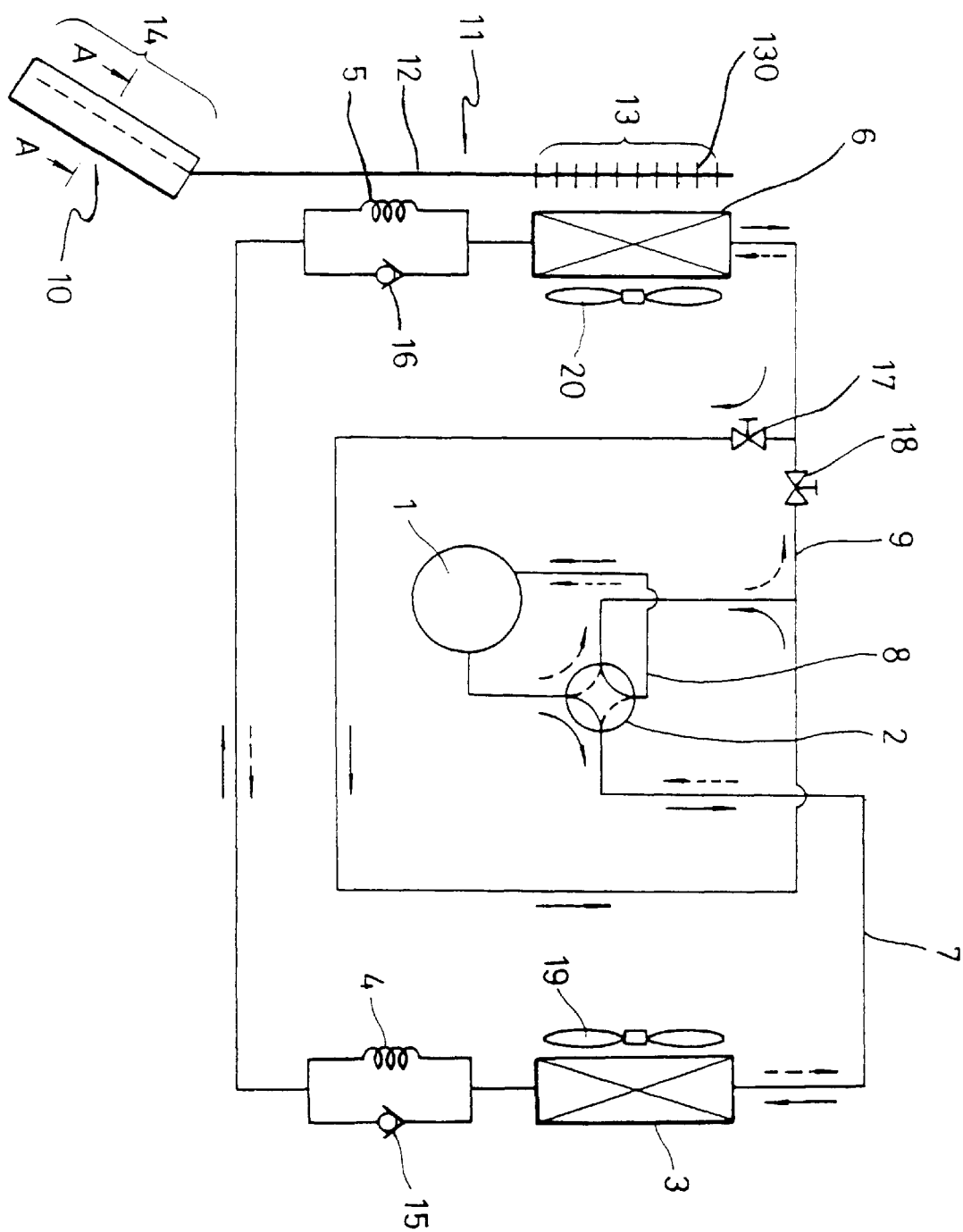
FIG. 1 is a schematic diagram showing the arrangement of a heat pump type air conditioning apparatus in accordance with a first embodiment of the present invention.

Reference now should be made to the drawings, in which the same reference numerals are used throughout the different drawings to designate the same or similar components.

Figure 2:
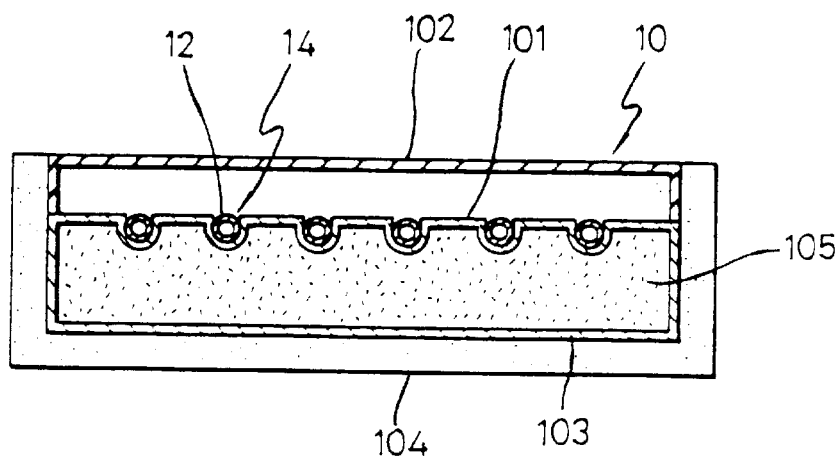
FIG. 2 is a cross section taken along line A—A of FIG. 1.
Figure 3:
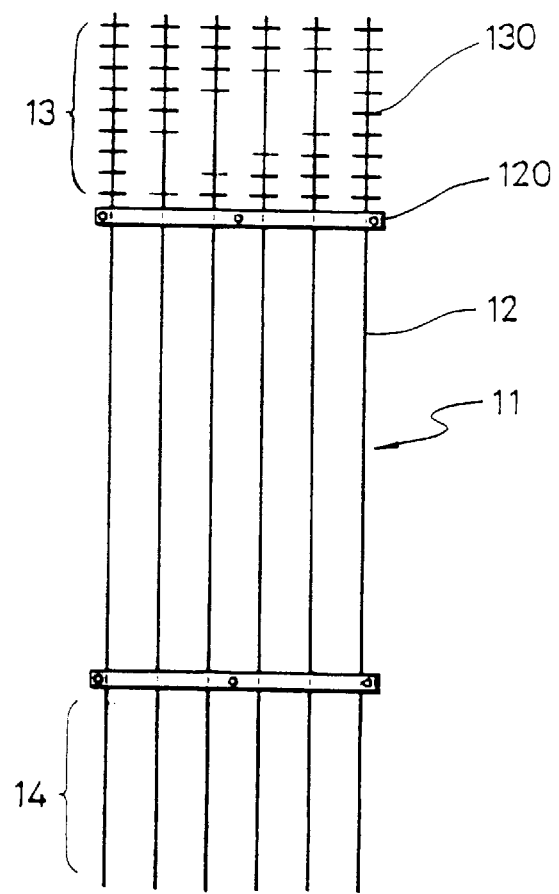
FIG. 3 is a side elevation showing a heat piping used for the heat pump type air conditioning apparatus of the first embodiment.

FIG. 1 is a schematic diagram showing the arrangement of a heat pump type air conditioning apparatus in accordance with a first embodiment of the present invention. FIG. 2 is a cross section taken along line A—A of FIG. 1. FIG. 3 is a side elevation showing a heat piping used for the heat pump type air conditioning apparatus of the first embodiment.

As illustrated in FIG. 1, the heat pump type air conditioning apparatus of the first embodiment comprises a compressor 1, a four-way valve 2, an indoor heat exchanger 3, a pressure reducer 4 for a room cooling operation, another pressure reducer 5 for a room heating operation and an outdoor heat exchanger 6. The compressor 1, the four-way valve 2, the indoor heat exchanger 3, the pressure reducer 4, the pressure reducer 5, the outdoor heat exchanger 6 and the four-way valve 2 are connected one after another in series by means of a first conduit 7. The four-way valve 2 is additionally connected to the compressor 1 by means of a suction conduit 8 to circulate coolant along the solid arrows of FIG. 1 during a room heating operation. Two points on the portion of the first conduit 7 directly connecting the outdoor heat exchanger 6 to the four-way valve 2 are additionally connected to each other by means of a second conduit 9. A heat piping 11 is disposed with its condensing portion 13 situated in front of the ambient air sucking side of the outdoor heat exchanger 6 and its evaporating portion 14 inserted into a solar heat collector 10 utilizing a cost-free heat source.

The heat piping 11 comprises a plurality of heat pipes 12 arranged parallel to one another by means of two fixing bars 120 and filled with working fluid, such as distilled water, alcohol, liquid ammonia or the like. The upper and lower portions of the heat piping 11 respectively constitute the condensing and evaporating portions 13 and 14. A plurality of heat dissipating fins 130 are regularly arranged on the condensing portion 13. Although the heat piping 11 has been depicted to be constructed of linear heat pipes 12 in FIG. 3, the heat piping 11 is not limited to this construction and may be constructed of looped heat pipes. Additionally, although the condensing portion 13 of the heat piping 11 has been depicted to be situated in front of a single sucking side of the outdoor heat exchanger 6 in FIG. 1, the condensing portion 13 of the heat piping 11 may be in front of three sucking sides of the outdoor heat exchanger 6. A plurality of valves (not shown) are disposed on the heat pipes 12 under the condensing portion 13.

The solar heat collector 10 comprises a heat-conductive plate 101 on which the evaporating portion 14 of the heat piping 11 is placed, a solar heat collecting cover 102 mounted over the top of the heat-conductive plate 101 and made of glass or synthetic resin, a top-opened insulating container 103 covered with insulating material 104, and latent or sensible heat accumulating material 105 filling the space between the heat-conductive plate 101 and the insulating container 103.

Reference numerals 15 and 16 designate check valves, reference numerals 17 and 18 designate on-off control valves, and reference numerals 19 and 20 designate fans.

For the heating operation of the heat pump type air conditioning apparatus of the first embodiment, the on-off control valve 17 is opened, the on-off control valve 18 is closed and the four-way valve 2 is manipulated as indicated by the solid arrows of FIG. 1. In the heating operation, there is formed a cycle in which refrigerant is compressed into high temperature and high pressure refrigerant gas in the compressor 1, the refrigerant gas passes through the four-way valve 2, the refrigerant gas is condensed and liquefied into refrigerant liquid in the indoor heat exchanger 3 functioning as a condenser and simultaneously radiates condensation heat to the interior of a room to heat the interior of the room, the refrigerant liquid passes through the check valve 15 and is reduced in pressure in the pressure reducer 5 for a heating operation, the refrigerant liquid is evaporated into low temperature and low pressure refrigerant gas in the outdoor heat exchanger 6 utilizing the ambient air as a heat source, and the refrigerant gas passes through the four-way valve 2 and the suction conduit 8 and enters the compressor 1.

While the room heating operation is performed through the abovedescribed cycle, the evaporation efficiency of the refrigerant is in proportion to the temperature of the ambient air. Accordingly, when the temperature of the ambient air is low the room heating capacity becomes insufficient. When the room heating capacity becomes insufficient, the valves mounted on the heat pipes 12 are opened and a solar heat intercepting cover (not shown) disposed on the solar heat collecting cover 102 of the solar heat collector 10 is removed. As a result, there is repeated a cycle in which the evaporating portion 14 of the heat piping 11 is heated by solar heat, the working fluid filling the evaporating portion 14 of the heat piping 11 is evaporated, the evaporated working fluid ascends to the condensing portion 13 of the heat piping 11, the evaporated working fluid is condensed in the condensing portion 13 of the heat piping 11 and the condensed working fluid descends back to the evaporating portion 14 of the heat piping 11. While the cycle is repeated, the ambient air around the condensing portion 13 is preheated by condensation heat radiated from the condensing portion 13 and is sent to the outdoor heat exchanger 6 by means of the fan 20, the defrosting of the outdoor heat exchanger 6 is achieved and the evaporation of the refrigerant is promoted in the outdoor heat exchanger 6, thereby allowing the room heating capacity of the air conditioning apparatus to be kept superior.

In addition, while the evaporating portion 14 is heated by solar heat collected by the solar heat collector 10, a portion of the solar heat is accumulated in the heat accumulating material 105 contained in the insulating container 104. The solar heat accumulated in the heat accumulating material 105 is radiated to the evaporating portion 14 in rainy weather or at night when solar heat is not radiated to the evaporating portion 14 and evaporates the working fluid in the evaporating portion 14, so that the room heating capacity of the air conditioning apparatus is not deteriorated even in rainy weather or at night.

For the cooling operation of the heat pump type air conditioning apparatus of the first embodiment, the on-off control valve 17 is closed, the on-off control valve 18 is opened and the four-way valve 2 is manipulated as indicated by the phantom arrows of FIG. 1. In the cooling operation, there is repeated a cycle in which refrigerant is compressed into high temperature and high pressure refrigerant gas in the compressor 1, the refrigerant gas passes through the fourway valve 2 and the second conduit 9 and is condensed and liquefied into refrigerant liquid in the outdoor heat exchanger 6 functioning as a condenser, the refrigerant liquid passes through the check valve 16 and is reduced in pressure in the pressure reducer 4 for a room cooling operation, the refrigerant liquid reduced in pressure is evaporated in the indoor heat exchanger 3 functioning as an evaporator and simultaneously absorbs evaporation heat from the interior of a room to cool the interior of the room, and the evaporated refrigerant gas passes through the four-way valve 2 and the suction conduit 8 and enters the compressor 1. During the room cooling operation, the heat piping 11 does not function.

Figure 4:
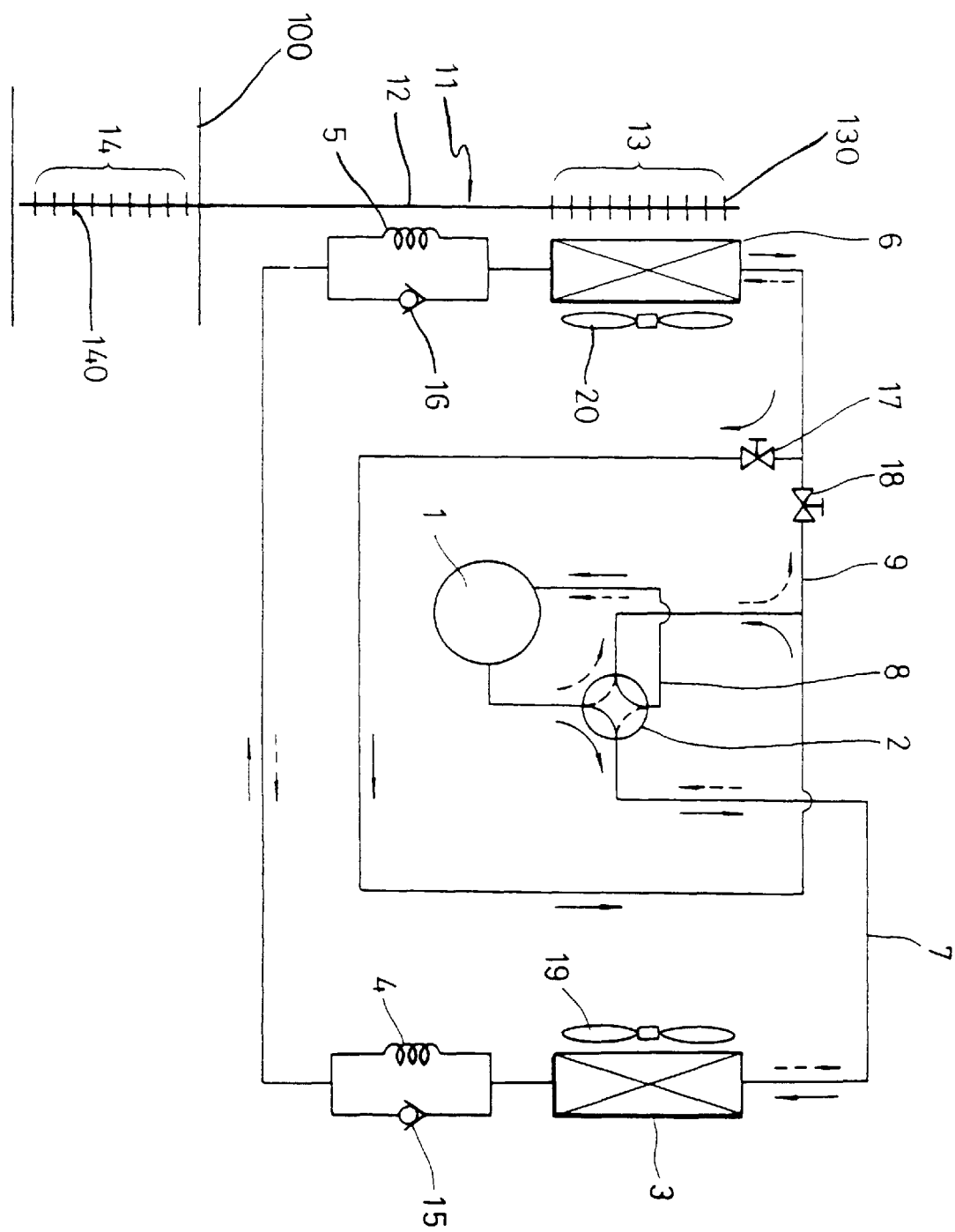
FIG. 4 is a schematic diagram showing the arrangement of a heat pump type air conditioning apparatus in accordance with a second embodiment of the present invention.

FIG. 4. is a schematic diagram showing the arrangement of a heat pump type air conditioning apparatus in accordance with a second embodiment of the present invention. The same reference numerals are used to designate the same components in FIGS. 1 and 4, and the description of the same components is omitted. The heat pump type air conditioning apparatus of the second embodiment is different from the heat pump type air conditioning apparatus of the first embodiment in that a plurality of fins 140 are regularly arranged on the evaporating portion 14 of a heat piping 11 and the evaporating portion 14 is disposed in a waste heat exhaust conduit 100, such as the flue of an industrial facility or the waste warm water discharge conduit of a public bath or fish farm. The waste heat exhaust conduit 100 may be a bypass of a main exhaustion conduit and a valve (not shown) may be mounted on the entrance of the waste heat exhaust conduit 100. Accordingly, by opening the valve mounted on the waste heat exhaust conduit 100 or the valves mounted on the heat pipes 12, the evaporating portion 14 of the heat piping is allowed to be heated only when the temperature of the ambient air is low.

The evaporating portion 14 may be disposed in a heated indoor place instead of the waste heat exhaustion conduit 100. In this case, the evaporating portion 14 can be heated by indoor heat.

In accordance with the second embodiment, a room is heated or cooled as in the first embodiment. If the temperature of the ambient air is low during a room heating operation, the evaporating portion 14 of the heat piping 11 is heated by waste heat that is a cost-free heat source. While evaporated working fluid is condensed in the condensing portion 13 of the heat piping 11, the working fluid radiates condensation heat to the outdoor heat exchanger 6. The defrosting of the outdoor heat exchanger 6 can be achieved and the superior room heating capacity of the air conditioning apparatus can be maintained.

As described above, the condensing and evaporating portions of the heat piping are respectively disposed near the outdoor heat exchanger and near the cost-free heat source, and the ambient air is preheated by condensation heat radiated from the condensing portion when the temperature of the ambient air is low. As a result, the outdoor heat exchanger is defrosted and the evaporation of refrigerant is promoted, so that superior room heating capacity can be maintained. In addition, the maintenance cost of the air conditioning apparatus is reduced because solar heat or waste heat is utilized as the heat source of the evaporating portion of the heat piping, and the superior room heating capacity of the air conditioning apparatus can be maintained in rainy weather or at night because accumulated solar heat is utilized to heat the evaporating portion of the heat piping 11.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A heat pump type air conditioning apparatus, comprising:

a heat pump having a compressor, a four-way valve, an indoor heat exchanger, a pressure reducer for a room cooling operation, another pressure reducer for a room heating operation and an outdoor heat exchanger, the compressor, the four-way valve, the indoor heat exchanger, the pressure reducer for a room cooling operation, the pressure reducer for a room heating operation, the outdoor heat exchanger and the four-way valve being connected one after another in series by means of a first conduit, the four-way valve being additionally connected to the compressor by means of a suction conduit, and two points on a portion of the first conduit directly connecting the outdoor heat exchanger to the four-way valve being additionally connected to each other by means of a second conduit; and a heat piping disposed with its condensing portion situated in front of an ambient air sucking side of the outdoor heat exchanger and its evaporating portion situated in a cost-free heat source.

2. The air conditioning apparatus according to claim 1, wherein said cost-free heat source is solar heat collected by a solar heat collector, waste heat existing in a flue of an industrial facility or waste warm water discharged from a public bath or fish farm.

3. The air conditioning apparatus according to claim 2, wherein said solar heat collector includes an insulating container, said insulating container being filled with solar heat accumulating material.

* * * * *